(12) United States Patent
Nakaya et al.

(10) Patent No.: US 10,353,397 B2
(45) Date of Patent: Jul. 16, 2019

(54) INFORMATION MANAGEMENT DEVICE, VEHICLE, AND INFORMATION MANAGEMENT METHOD

(71) Applicant: Panasonic Intellectual Property Management Co., Ltd., Osaka (JP)

(72) Inventors: Satoshi Nakaya, Osaka (JP); Takashi Yoshida, Kanagawa (JP); Hiroki Kawahara, Kanagawa (JP); Takenori Matsumoto, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 81 days.

(21) Appl. No.: 15/502,866

(22) PCT Filed: Jun. 8, 2015

(86) PCT No.: PCT/JP2015/002855
§ 371 (c)(1),
(2) Date: Feb. 9, 2017

(87) PCT Pub. No.: WO2016/027394
PCT Pub. Date: Feb. 25, 2016

(65) Prior Publication Data
US 2017/0242441 A1 Aug. 24, 2017

(30) Foreign Application Priority Data
Aug. 21, 2014 (JP) .................................. 2014-168154

(51) Int. Cl.
*B60W 40/02* (2006.01)
*G05D 1/02* (2006.01)
(Continued)

(52) U.S. Cl.
CPC ....... *G05D 1/0248* (2013.01); *G01B 11/2518* (2013.01); *G01C 21/32* (2013.01);
(Continued)

(58) Field of Classification Search
CPC .............. G05D 1/0248; G05D 1/0088; G01C 21/3647; G01C 21/3638; G01C 21/3602; G01S 17/023; G01S 17/10; G01B 11/2518
(Continued)

(56) References Cited

U.S. PATENT DOCUMENTS 9,719,801 B1 *  8/2017  Ferguson ............... G01C 25/00
2009/0037465 A1 *  2/2009  Marti ................ G06F 17/30241
(Continued)

FOREIGN PATENT DOCUMENTS

JP  2000-074669 A   3/2000
JP  2000-338865 A  12/2000
(Continued)

OTHER PUBLICATIONS

International Search Report of PCT application No. PCT/JP2015/002855 dated Jul. 21, 2015.
(Continued)

*Primary Examiner* — Genna M Mott
(74) *Attorney, Agent, or Firm* — Pearne & Gordon LLP

(57) ABSTRACT

An information management device includes a difference extractor and a determination unit. The difference extractor extracts, as difference information, vehicle peripheral three-dimensional information detected by a vehicle and three-dimensional map information. The determination unit determines whether the extracted difference information is a difference inherent to the vehicle.

19 Claims, 3 Drawing Sheets

(51) Int. Cl.
  *G08G 1/0969* (2006.01)
  *G01B 11/25* (2006.01)
  *G01C 21/36* (2006.01)
  *G01S 17/02* (2006.01)
  *G01S 17/10* (2006.01)
  *G05D 1/00* (2006.01)
  *G01C 21/32* (2006.01)

(52) U.S. Cl.
  CPC ..... *G01C 21/3602* (2013.01); *G01C 21/3638* (2013.01); *G01C 21/3647* (2013.01); *G01S 17/023* (2013.01); *G01S 17/10* (2013.01); *G05D 1/0088* (2013.01); *G08G 1/0969* (2013.01)

(58) Field of Classification Search
  USPC ........................................................ 701/450
  See application file for complete search history.

(56) References Cited

U.S. PATENT DOCUMENTS

2009/0140887 A1   6/2009  Breed et al.
2011/0013021 A1*  1/2011  Hongo .................... B60R 1/00
                                                348/148
2017/0108338 A1*  4/2017  Larnaout .............. G01C 21/005

FOREIGN PATENT DOCUMENTS

JP    2002-341757 A    11/2002
JP    2009-069900 A    4/2009
JP    2009-199572 A    9/2009

OTHER PUBLICATIONS

The Extended European Search Report dated Jul. 31, 2017 for the related European Patent Application No. 15833018.3.

* cited by examiner

INFORMATION MANAGEMENT DEVICE, VEHICLE, AND INFORMATION MANAGEMENT METHOD

TECHNICAL FIELD

The present invention relates to an information management device, a vehicle, and an information management method which use three-dimensional map information.

BACKGROUND ART

In recent years, vehicles have been developed which self-drive while sensing the periphery of own vehicle with various sensors such as a camera and a laser radar mounted on the vehicle.

In order to enable a function of the self-driving, three-dimensional map information having accurate road information is necessary. The accurate road information is three-dimensional information including, for example, not only road widths, lanes, detailed position information of signs, and the like but information of inclinations of roads, unevenness of roads, unevenness of shoulders, and the like.

By using the three-dimensional map information, driving instruction information is generated with which a vehicle automatically travel to a destination. The vehicle is able to automatically travel to a destination by adding, on the basis of the driving instruction information, real-time three-dimensional information in the periphery of the vehicle detected by various sensors mounted on the vehicle (for example, PTL 1).

In order to generate three-dimensional map information, a surveying vehicle is used on which various sensors such as a highly accurate camera, a laser radar, and the like are mounted. The various sensors are disposed on, for example, a part above a roof of the vehicle (for example, PTL 2).

Further, in an example of a conventional information management device using three-dimensional map information, when it is determined that a road shape recognized on the basis of an image captured by a vehicle-mounted camera is different from a road shape based on stored road map data, information is transmitted to a management server, where the information includes a spot at which the respective pieces of road information are different and the information further includes the captured image at the spot.

The management server accumulates information about a spot at which a road shape in road map data is different from an actual road shape based on an image captured by a vehicle-mounted camera. Because information about the spot whose road map data needs to be updated is obtained at a time when the road map data is updated, it is possible to reduce time and effort for updating (for example, PTL 3).

CITATION LIST

Patent Literature

PTL 1: Unexamined Japanese Patent Publication No. 2009-199572

PTL 2: Unexamined Japanese Patent Publication No. 2000-74669

PTL 3: Unexamined Japanese Patent Publication No. 2009-69900

SUMMARY OF THE INVENTION

The present invention provides an information management device in which it is possible to correct a difference in measurement conditions between a surveying vehicle for generating three-dimensional map information and a vehicle which uses the three-dimensional map information.

An information management device according to an aspect of the present invention includes a difference extractor and a determination unit. The difference extractor extracts as difference information a difference between vehicle peripheral three-dimensional information detected by a vehicle and three-dimensional map information. The determination unit determines whether the extracted difference information is a difference inherent to the vehicle.

An information management method according to an aspect of the present invention includes a difference extraction step in which the difference between vehicle peripheral three-dimensional information detected by a vehicle and three-dimensional map information is extracted as difference information, and a determination step in which it is determined whether the difference information is a difference inherent to the vehicle.

If the present invention determines that the difference information is the difference inherent to the vehicle, the present invention generates correction information on the basis of the difference information. By this operation, it is possible to correct the difference in the measurement conditions between the surveying vehicle for generating three-dimensional map information and the vehicle which uses the three-dimensional map information.

DESCRIPTION OF EMBODIMENT

Figure 1:
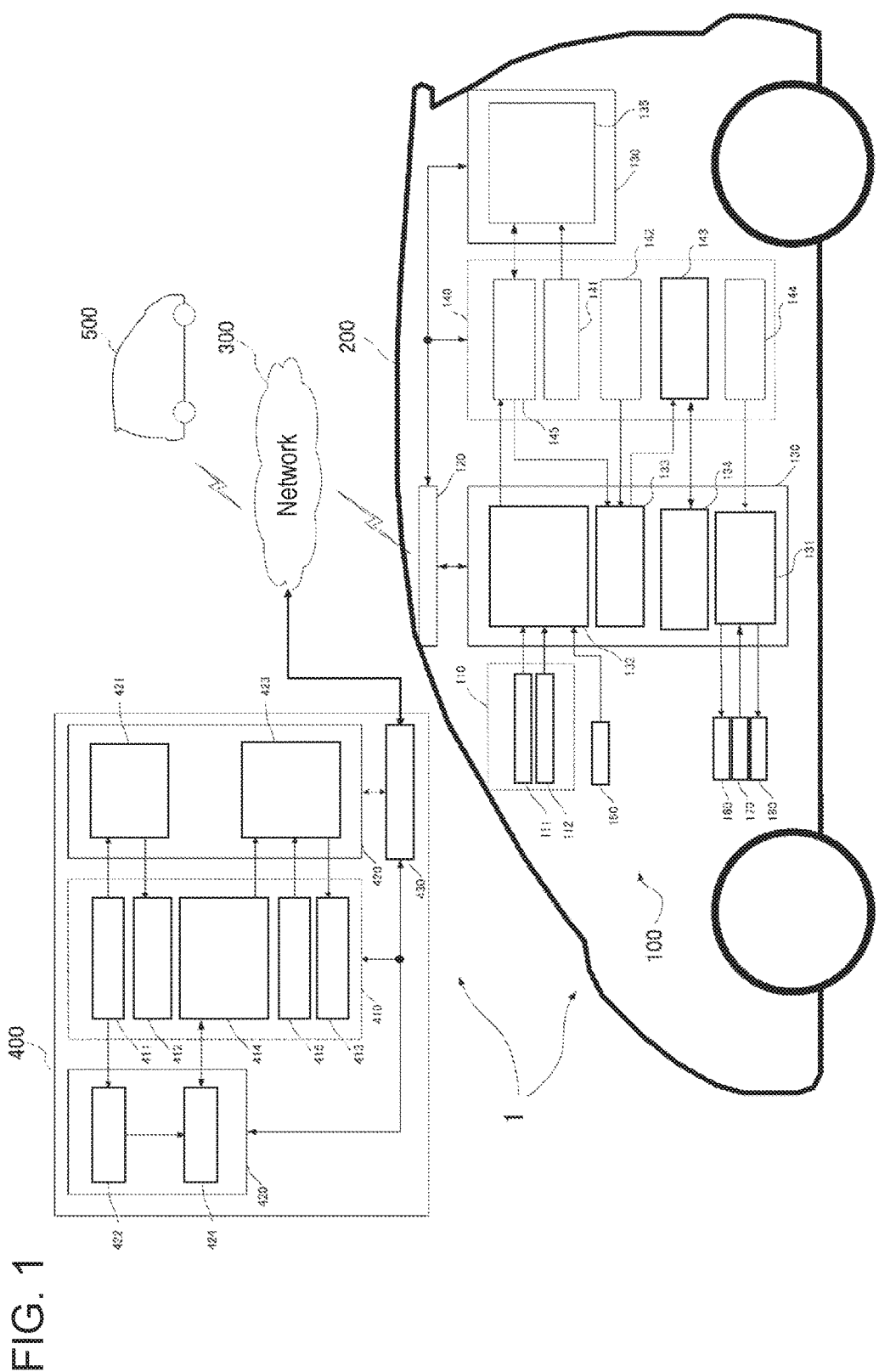
FIG. 1 is a block diagram showing an information management device according to an exemplary embodiment of the present invention and a peripheral configuration.

Before an exemplary embodiment of the present invention is described, problems in a conventional information management device will be briefly described. In order to achieve self-driving described in PTL 1 by using three-dimensional map information generated by the technique described in PTL 2, three-dimensional map information needs to be accurate. On the other hand, conditions of roads are always changing. To address this issue, it is useful to update three-dimensional map information by the technique described in PTL 3.

However, in the case that three-dimensional map information is updated by the technique described in PTL 3, there arises a following problem.

Various sensors mounted on a vehicle which actually performs self-driving are different from various sensors mounted on a surveying vehicle which generates three-dimensional map information. For example, the various sensors mounted on the surveying vehicle are disposed on a part higher than the roof of the vehicle; however, the various sensors mounted on the vehicle which performs self-driving are disposed in the periphery of the bumper in some cases.

When the positions at which the various sensors are disposed are different as described above, there is a possibility that the same bump on a road is detected to have different heights, for example. Thus, due to the difference in mounting positions, the height of an object detected by a vehicle is different from the height of an object included in three-dimensional map information, for example.

Not only the difference in mounting positions, but also the difference in accuracies and performances of various sensors creates a difference. Accuracies or performances of various sensors include, for example, a resolution of sensor and a searching range of sensor.

Such differences due to the sensor conditions of a surveying vehicle and a vehicle actually using three-dimensional map information (hereinafter, referred to as the "difference in measurement conditions") are problems when map information is updated by the technique described in PTL 3.

According to the technique shown in PTL 3, a management server accumulates information about a spot at which the road shape in road map data is different from the road shape based on a vehicle-mounted camera image. However, even in the case that the road shape in the road map data is determined to be different from the road shape based on the vehicle-mounted camera image, there may be no difference created in the actual road shape but the difference may be a difference due to the difference in the measurement conditions. As a result, even if there in not difference, difference may be determined to exist, and the map information may be updated.

As described above, because the difference in the measurement conditions is not considered in the technique described in PTL 3, there is a problem that the map information is not accurately updated in some cases.

In order to achieve the self-driving described in PTL 1, the three-dimensional map information needs to be accurate; however, if the difference in the measurement conditions is not corrected, the three-dimensional map information cannot be accurately updated, and as a result, there can be a possibility that safe self-driving is not achieved.

Hereinafter, an exemplary embodiment of the present invention will be described in detail with reference to the drawings. Note that, hereinafter, the same elements are assigned the same reference marks in all the drawings for illustrating each exemplary embodiment and are not described again.

Hereinafter, an exemplary embodiment of the present invention will be described in detail with reference to FIG. 1 to FIG. 3. First with reference to FIG. 1, a description will be given on an information management device and a peripheral configuration.

[Configuration of Information Management Device]

An information management device 1 of the present exemplary embodiment is configured with self-driving support server 400 and vehicle-mounted device 100. Vehicle-mounted device 100 is a device mounted on vehicle 200, and self-driving support server 400 is a computer installed outside vehicle 200.

Vehicle-mounted device 100 and self-driving support server 400 can communicate with each other through network 300. Self-driving support server 400 can mutually communicate with vehicles other than vehicle 200 such as another vehicle 500 in FIG. 1.

As network 300, wireless communication is typically used; however, wired communication can be applied, for example, when communication is performed through a charging cable, which is a wire, during charge of an electric vehicle or the like. Next, detailed configurations of vehicle-mounted device 100 and self-driving support server 400 will be described.

[Configuration of Vehicle-Mounted Device]

Vehicle-mounted device 100 includes detector 110, vehicle-side communication unit 120, vehicle-side controller 130, vehicle-side information storage 140, GPS receiver 150, notification unit 160, operation unit 170, and drive unit 180.

Detector 110 detects three-dimensional information in the periphery of vehicle 200 (hereinafter, referred to as vehicle peripheral three-dimensional information). Detector 110 includes camera 111 and laser radar 112.

Camera 111 is configured with, for example, a plurality of cameras and can detect vehicle peripheral three-dimensional information from the difference between two-dimensional images taken by the respective cameras. Further, laser radar 112 sends laser pulses to the periphery of vehicle 200 and detects vehicle peripheral three-dimensional information by measuring distances to objects in the periphery of the vehicle on the basis of return time of reflected light. It is also possible to scan with a laser beam to detect the shape of an object in the periphery of the vehicle. Detector 110 may include other sensors than the above sensors.

Vehicle-side communication unit 120 transmits and receives various pieces of information to and from self-driving support server 400 through network 300. Vehicle-side communication unit 120 performs communication through, for example, wireless communication using a mobile telephone line. Vehicle-side communication unit 120 is controlled by vehicle-side controller 130.

Vehicle-side controller 130 is a processing unit including, for example, a CPU (central processing unit) and a RAM (Random Access Memory) and is configured to transmit and receive information and to control the respective units. Vehicle-side controller 130 is connected to detector 110, vehicle-side communication unit 120, vehicle-side information storage 140, GPS receiver 150, notification unit 160, operation unit 170, and drive unit 180.

Specifically, vehicle-side controller 130 is configured with drive controller 131, vehicle peripheral three-dimensional information extractor 132, difference extractor 133, determination unit 134, and vehicle peripheral three-dimensional information corrector 135. A function of each unit equipped on vehicle-side controller 130 will be described in detail later with reference to FIG. 2.

Vehicle-side information storage 140 is configured with a device such as a hard disk or a RAM (Random Access Memory) which can store information. Various pieces of information can be written in and read out to and from vehicle-side information storage 140 being controlled by vehicle-side controller 130.

Being controlled by vehicle-side controller 130, vehicle-side information storage 140 and vehicle-side communication unit 120 can also mutually transmit and receive information.

Specifically, vehicle-side information storage 140 includes vehicle's inherent correction information storage 141, three-dimensional map information storage 142, difference information storage 143, driving instruction information storage 144, and vehicle peripheral three-dimensional information storage 145.

Vehicle-side information storage 140 may be configured with a single storage device or may be configured with a plurality of storage devices. Various pieces of information to be stored in vehicle-side information storage 140 will be described later in detail with reference to FIG. 2.

GPS receiver 150 receives signals from a plurality of GPS (Global Positioning System) satellites and acquires position information indicating the current position of vehicle 200 by demodulating the received signals. GPS receiver 150 outputs the acquired position information to vehicle-side controller 130.

Notification unit 160 is a display, a speaker, or an actuator, and notifies a driver of various pieces of information with at least one of sound, light, and vibration. Notification unit 160 is controlled by vehicle-side controller 130.

Operation unit 170 is a device such as a switch or a touch panel which can be operated by a user. A driver as a user can specify execution of various settings about self-driving by operating operation unit 170. Here, the term "self-driving" means a function which automatically drives a vehicle to a destination and means whole of a function which automatically moves a vehicle by means other than a driving operation of a driver.

Drive unit 180 generates driving force to turn wheels of the vehicle. Drive unit 180 is, for example, an electric motor or an engine of various types. At the time of manual driving, drive unit 180 is controlled depending on an acceleration/deceleration operation of a driver. On the other hand, when self-driving is being performed, drive unit 180 is controlled directly by drive controller 131.

[Configuration of Self-Driving Support Server]

Next, a configuration of self-driving support server 400 will be described in detail. Self-driving support server 400 is a computer having a CPU (Central Processing Unit) functioning as a processing unit, a RAM (Random Access Memory) and a hard disk functioning as server-side information storage 410, a communication device, a display or a printer functioning as an information output unit, an input device to input an operation instruction of an operator, and other components.

Self-driving support server 400 is configured to include server-side information storage 410, server-side controller 420, and server-side communication unit 430. Next, a description will be given on detailed configurations of server-side information storage 410, server-side controller 420, and server-side communication unit 430.

Server-side information storage 410 is configured with a device such as a hard disk or a RAM (Random Access Memory) which can store information. Various pieces of information can be written in and read out to and from server-side information storage 410 being controlled by server-side controller 420.

Being controlled by server-side controller 420, server-side information storage 410 and server-side communication unit 430 can also mutually transmit and receive information.

Specifically, server-side information storage 410 includes difference information storage 411, vehicle's inherent correction information storage 412, driving instruction information storage 413, three-dimensional map information storage 414, and destination information storage 415.

Server-side information storage 410 may be configured with a single storage device or may be configured with a plurality of storage devices. The various pieces of information to be stored in server-side information storage 410 will be described later in detail with reference to FIG. 2.

Server-side controller 420 is a processing unit including, for example, a CPU (Central Processing Unit) and RAM (Random Access Memory) and is configured to transmit and receive information and to control the respective units.

Specifically, server-side controller 420 is configured with vehicle's inherent correction information generator 421, collection unit 422, driving instruction information generator 423, and three-dimensional map information update unit 424. Functions of the respective units of server-side controller 420 will be described later in detail with reference to FIG. 2.

Server-side communication unit 430 transmits and receives various pieces of information to and from vehicle 200 through network 300. Server-side communication unit 430 performs communication in a similar way to vehicle-side communication unit 120 through, for example, wireless communication using a mobile telephone line. Server-side communication unit 430 is controlled by server-side controller 420. Server-side communication unit 430 can also communicate with another vehicle (for example, vehicle 500) other than vehicle 200.

[Operations of Vehicle-Mounted Device and Self-Driving Support Server]

Figure 2:
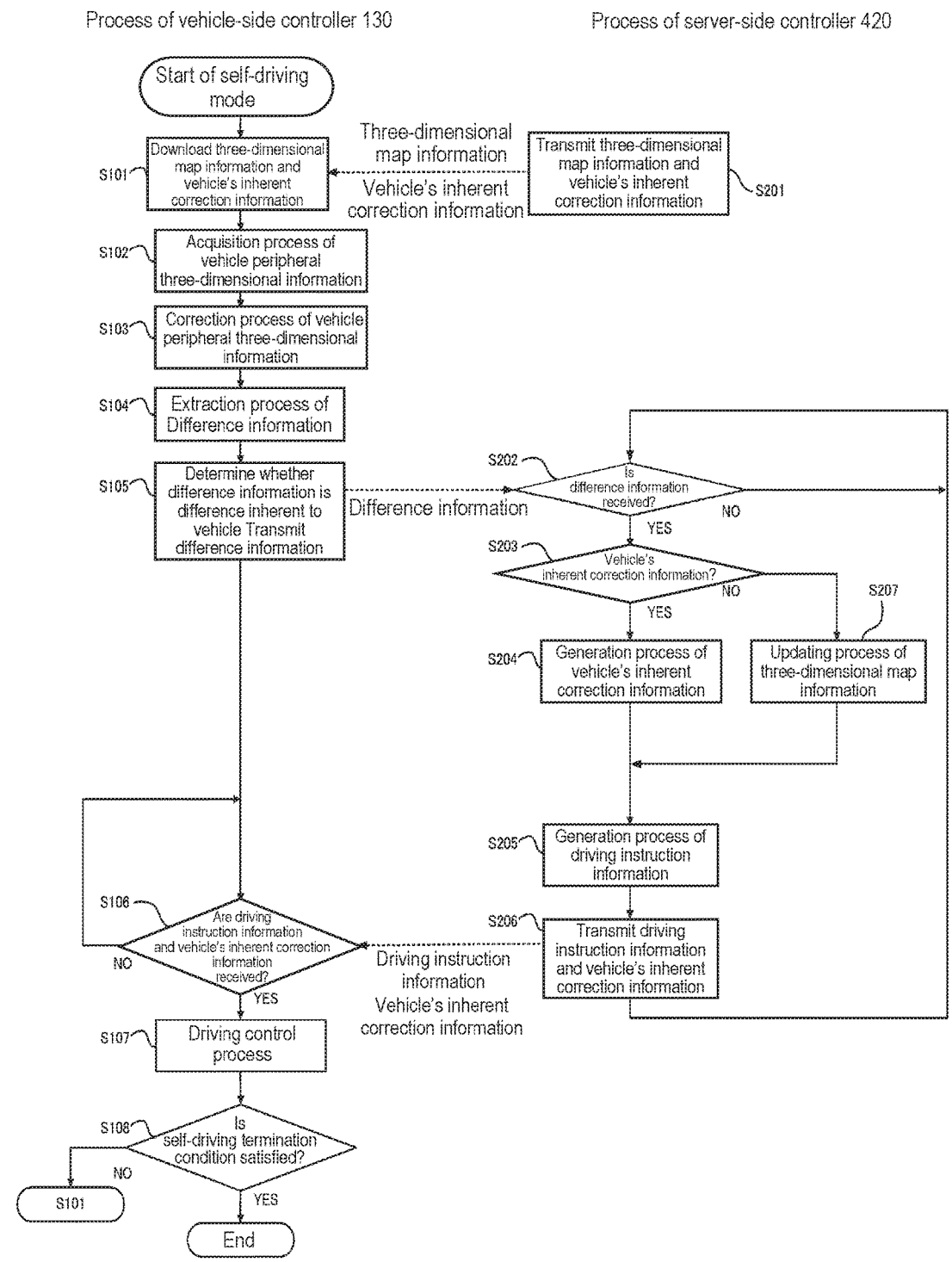
FIG. 2 is a flowchart showing an operation example of the information management device according to an exemplary embodiment of the present invention.

FIG. 2 is a flowchart showing an operation example of the vehicle-mounted device and the self-driving support server according to the present exemplary embodiment. Specifically, the process of FIG. 2 is performed by vehicle-side controller 130 and server-side controller 420. Steps S101 to S107 represent a processing operation of vehicle-side controller 130. Further, steps S201 to S206 represent a processing operation of server-side controller 420.

First, when a self-driving mode is started by a user operation on operation unit 170 or the like, vehicle-side controller 130 downloads three-dimensional map information and vehicle's inherent correction information (step S101).

If receiving an instruction of download, server-side controller 420 performs control such that three-dimensional map information stored in three-dimensional map information storage 414 and vehicle's inherent correction information stored in vehicle's inherent correction information storage 412 are sent from server-side communication unit 430 (step S201).

The three-dimensional map information received by vehicle-mounted device 100 is stored in three-dimensional map information storage 142. Further, the vehicle's inherent correction information received by vehicle-mounted device 100 is stored in vehicle's inherent correction information storage 141.

The three-dimensional map information stored in three-dimensional map information storage 414 is information generated on the basis of the result of measurement conducted by a surveying vehicle exclusive for generating three-dimensional map information.

The three-dimensional map information is information corresponding to position information. The three-dimensional map information includes as accurate road information three-dimensional information including, for example, not only road widths, lanes, detailed position information of signs, and the like but also information of inclinations of roads, unevenness of roads, unevenness of shoulders, and the like. The vehicle's inherent correction information will be described later.

Subsequent to step S101, vehicle peripheral three-dimensional information extractor 132 acquires vehicle peripheral three-dimensional information, which is three-dimensional information in the periphery of vehicle 200 at the point of time, on the basis of a detection result of detector 110 (step S102). The acquired vehicle peripheral three-dimensional information is stored in vehicle peripheral three-dimensional information storage 145. The vehicle peripheral three-dimensional information is stored in vehicle peripheral three-dimensional information storage 145, in association with a current position of vehicle 200 detected by GPS receiver 150.

Subsequent to step S102, vehicle peripheral three-dimensional information corrector 135 reads out the vehicle peripheral three-dimensional information stored in vehicle peripheral three-dimensional information storage 145, corrects the read-out information by using the vehicle's inherent correction information stored in vehicle's inherent correction information storage 141, and then stores again the corrected information in vehicle peripheral three-dimensional information storage 145 (step S103). This process will be described later in detail.

Subsequent to step S103, difference extractor 133 extracts as difference information the difference between the vehicle peripheral three-dimensional information detected by vehicle 200 and the three-dimensional map information (step S104). The difference here is, for example, an object which does not exist in the three-dimensional map information but is included in the vehicle peripheral three-dimensional information. Further, the difference is, in some cases, based on the difference in measurement conditions between the surveying vehicle and the vehicle using three-dimensional map information. The extracted difference information is stored in difference information storage 143.

Difference extractor 133 extracts the difference information by using the three-dimensional map information corresponding to the position information of vehicle 200 at the time when vehicle 200 detected the vehicle peripheral three-dimensional information. By this operation, comparison can be made between the information for the same position.

Subsequent to step S104, determination unit 134 determines whether the difference information is a difference inherent to vehicle 200 (step S105).

Here, the difference inherent to vehicle 200 to be determined by determination unit 134 is a difference based on at least one of a position at which detector 110 is fixed for vehicle 200 to detect vehicle peripheral three-dimensional information, accuracy of detector 110, and performance of detector 110.

The result of this determination is stored, as a part of difference information, in difference information storage 143 in association with the extracted difference information.

Vehicle-side controller 130 transmits the difference information stored in difference information storage 143 to self-driving support server 400. If receiving the difference information (step S202: YES), server-side controller 420 stores the received difference information in difference information storage 411. If server-side controller 420 does not receive the difference information (step S202: NO), server-side controller 420 performs step S202 again.

If the received difference information is the information which is determined to be the difference inherent to vehicle 200 by determination unit 134 (step S203: YES), vehicle's inherent correction information generator 421 generates, on the basis of the difference information stored in difference information storage 411, vehicle's inherent correction information with which the vehicle peripheral three-dimensional information detected by vehicle 200 is corrected (step S204).

The vehicle's inherent correction information generated by vehicle's inherent correction information generator 421 is stored in vehicle's inherent correction information storage 412.

The vehicle's inherent correction information is represented by, for example, a predetermined coefficient, a predetermined length, or a degree of priority. For example, if it is found through a statistical process that the vehicle peripheral three-dimensional information is different from the three-dimensional map information at a constant ratio, vehicle's inherent correction information generator 421 generates vehicle's inherent correction information so that the vehicle peripheral three-dimensional information is multiplied by a predetermined coefficient. If the vehicle peripheral three-dimensional information is different by a constant length, it is also possible for vehicle's inherent correction information generator 421 to generate vehicle's inherent correction information so that the vehicle peripheral three-dimensional information is increased or decreased by a predetermined length.

In the process of above-mentioned step S103, vehicle peripheral three-dimensional information corrector 135 corrects the vehicle peripheral three-dimensional information on the basis of the vehicle's inherent correction information. By this process, the difference extracted by difference extractor 133 becomes closer to the difference other than the difference due to the difference in measurement conditions between the surveying vehicle and vehicle 200, in other words, becomes closer to the real difference of the three-dimensional information.

Subsequent to step S204, driving instruction information generator 423 generates driving instruction information for vehicle 200 to perform self-driving, on the basis of the three-dimensional map information stored in three-dimensional map information storage 414 and destination information stored in destination information storage 415.

The destination information is information including the position information of a destination to which vehicle 200 is headed, and the destination information is previously received from vehicle 200 and is then stored.

Specifically, driving instruction information generator 423 calculates a detailed lane position, a speed, acceleration, and the like to generate the driving instruction information for vehicle 200 to automatically travel to the destination. The calculated driving instruction information is stored in driving instruction information storage 413 (step S205).

Server-side controller 420 transmits the driving instruction information and the vehicle's inherent correction information to vehicle 200 (step S206). If vehicle-side controller 130 receives the driving instruction information and the vehicle's inherent correction information (step S106: YES), vehicle-side controller 130 stores the driving instruction information in driving instruction information storage 144 and the vehicle's inherent correction information in vehicle's inherent correction information storage 141. If vehicle-side controller 130 does not receive the driving instruction information (step S106: NO), vehicle-side controller 130 performs step S106 again.

If the driving instruction information and the vehicle's inherent correction information are received (step S106: YES), drive controller 131 controls vehicle 200 on the basis of the driving instruction information stored in driving instruction information storage 144 (step S107). Specifically, drive controller 131 performs control drive unit 180 so that the vehicle can automatically drives, on the basis of the driving instruction information corresponding to the position information acquired by GPS receiver 150. While performing self-driving, drive controller 131 notifies from notification unit 160 that self-driving is being performed.

If a self-driving termination condition is satisfied (step S108: YES), drive controller 131 finishes the process (END in FIG. 2). The self-driving termination condition is an occasion that vehicle 200 has reached the destination or some event has happened to interrupt self-driving.

If the self-driving termination condition is not satisfied (step S108: NO), vehicle-side controller 130 returns the process to step S101 while continuing to perform self-driving.

It should be noted that, after the process is finished (END in FIG. 2), if vehicle-side controller 130 starts self-driving again on response to a user operation on operation unit 170 or the like, the process can be started again (START of self-driving mode in FIG. 2).

In step S202, if the received difference information is the information which is determined not to be the difference inherent to vehicle 200 (step S203: NO), collection unit 422 collects the concerned data. Three-dimensional map information update unit 424 updates the three-dimensional map information stored in three-dimensional map information storage 414, on the basis of the difference information collected by collection unit 422 (step S207).

The information which is determined not to be the difference inherent to vehicle 200 indicates that the three-dimensional information of the road on which vehicle 200 is running is different from the three-dimensional map information stored in three-dimensional map information storage 414. The difference information transmitted from vehicle 200 is extracted after the vehicle peripheral three-dimensional information is corrected in the process of above-mentioned step S103. Therefore, the difference information collected by collection unit 422 is closer to the real difference.

Three-dimensional map information update unit 424 can update the three-dimensional map information on the basis of not only the information of only one vehicle but also, for example, the difference information transmitted from a plurality of vehicles such as the information transmitted from another vehicle 500. By this operation, the three-dimensional map information can be updated more accurately.

Figure 3:
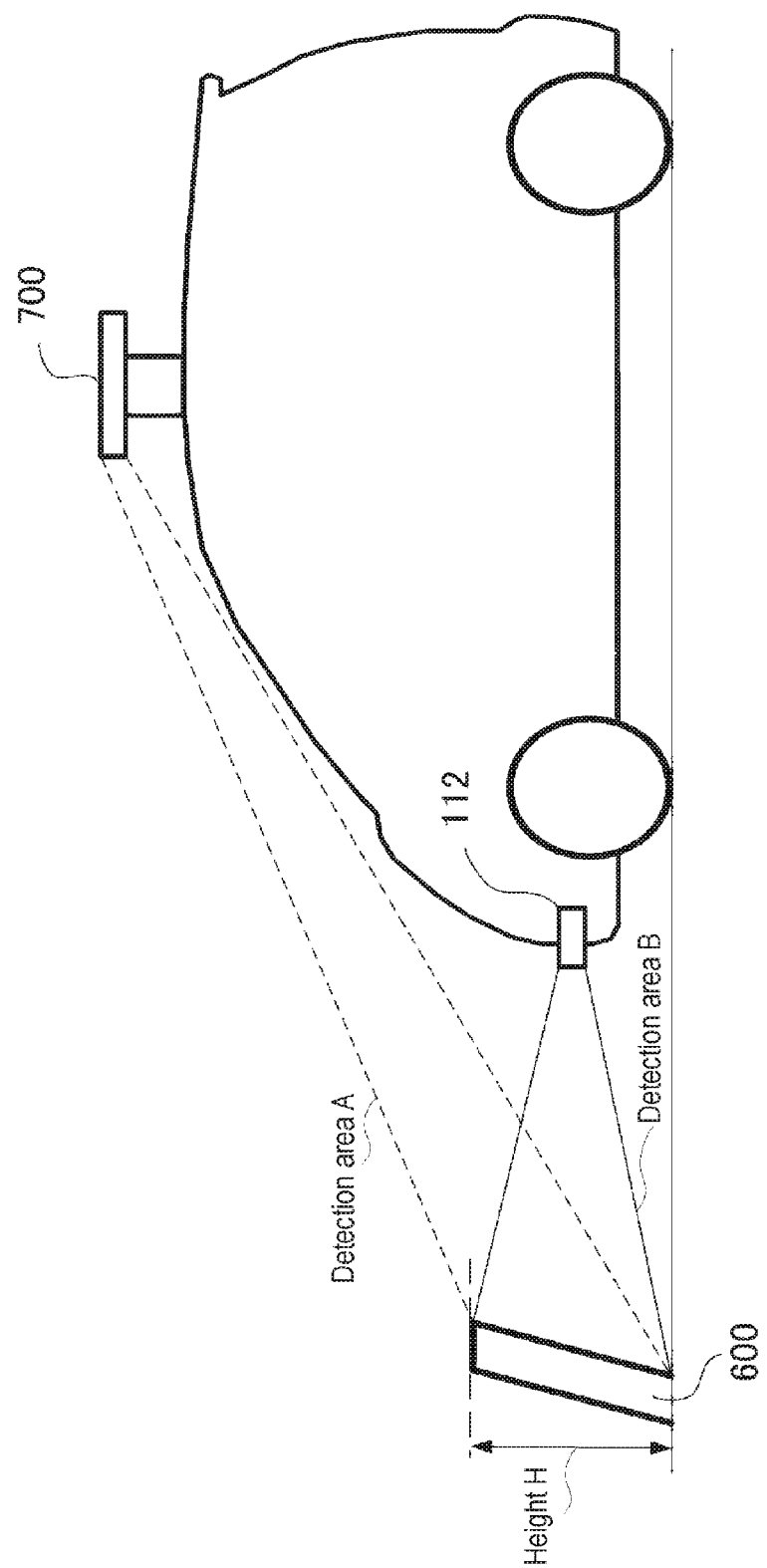
FIG. 3 is a diagram illustrating the difference in measurement conditions between a surveying vehicle and a vehicle which uses three-dimensional map information.

Finally, with reference to FIG. 3, a description is given on the difference in measurement conditions between a surveying vehicle for generating three-dimensional map information and a vehicle using three-dimensional map information. FIG. 3 is a diagram illustrating the difference in measurement conditions between the surveying vehicle and the vehicle using three-dimensional map information.

Surveying vehicle laser radar 700 is a radar mounted on a surveying vehicle, which is an exclusive vehicle for generating three-dimensional map information. On the other hand, laser radar 112 is a radar mounted on vehicle 200, which is a vehicle using three-dimensional map information. For the sake of convenience, the description is made with reference to the diagram in which laser radar 112 and surveying vehicle laser radar 700 are mounted on the same vehicle; however, laser radar 112 and surveying vehicle laser radar 700 are actually mounted on different vehicles.

Surveying vehicle laser radar 700 is disposed at a part higher than the roof of the vehicle. The reason why vehicle laser radar 700 is disposed at this position is because all of the periphery of the vehicle can be searched from this position. On the other hand, laser radar 112 is disposed in the vicinity of a front bumper of the vehicle.

A description will be given on the case that obstacle 600 is in front of the vehicle, for example. For example, obstacle 600 is assumed to have a height of H vertically above the ground.

A discussion is made on the cases that obstacle 600 is detected in a detection area A of surveying vehicle laser radar 700 and in a detection area B of laser radar 112. Angles of obstacle 600 viewed from respective laser radars are different due to a difference in the mounting positions. The laser radar measures a distance to an object from a time between sending a laser pulse and returning of the reflected wave. Therefore, if the angle of obstacle 600 with respect to detection area A is different, the viewed height of the object is detected to be different.

As described above, if the mounting position of the laser radar is different, the same bump on a road is detected to have a different height in some cases, for example. The difference is created depending on not only the difference in mounting position but also the difference in accuracy or performance of various sensors.

If the three-dimensional map information is updated, without correcting these differences, by using the difference information between the vehicle peripheral three-dimensional information detected by the vehicle and the three-dimensional map information, the three-dimensional map information may be inaccurate. In order to achieve self-driving, the three-dimensional map information needs to be accurate, and if the three-dimensional map information is not updated accurately, there may be a possibility that safe self-driving cannot be achieved.

Modified Example

In the present exemplary embodiment, the functions of vehicle-side controller 130 and the functions of server-side controller 420 are interchangeable. For example, the process performed by determination unit 134 (step S105) may be performed by server-side controller 420. Further, the process performed by vehicle's inherent correction information generator 421 (step S204) may be performed by vehicle-side controller 130. The function may be appropriately shared depending on a processing load, a communication speed, and the like.

Further, it is described above that the process of steps S102 to S105 and S202 to S203 for generating the vehicle's inherent correction information (step S204) is performed during a self-driving mode; however, the process may be performed during a normal driving in which driving is performed by an operation of a driver. With this arrangement, also during normal driving, it is possible to correct the difference in measurement conditions between the surveying vehicle and the vehicle using three-dimensional map information.

Effect of Present Exemplary Embodiment

If difference information is determined to be a difference inherent to a vehicle, the information management device of the present exemplary embodiment generates correction information on the basis of the difference information. This arrangement provides an advantageous effect that it is possible for the present invention to correct the difference in measurement conditions between a surveying vehicle for generating three-dimensional map information and a vehicle using the three-dimensional map information.

INDUSTRIAL APPLICABILITY

The present invention is preferable for an information management device and the like which use three-dimensional map information.

REFERENCE MARKS IN THE DRAWINGS 1 information management device
100 vehicle-mounted device
110 detector
111 camera
112 laser radar
120 vehicle-side communication unit
130 vehicle-side controller
131 drive controller
132 vehicle peripheral three-dimensional information extractor
133 difference extractor
134 determination unit
135 vehicle peripheral three-dimensional information corrector
140 vehicle-side information storage (information storage)
141 vehicle's inherent correction information storage
142 three-dimensional map information storage
143 difference information storage
144 driving instruction information storage
145 vehicle peripheral three-dimensional information storage
150 GPS receiver (current position obtaining unit)
160 notification unit
170 operation unit
180 drive unit
200 vehicle
300 network
400 self-driving support server
410 server-side information storage (information storage)
411 difference information storage
412 vehicle's inherent correction information storage
413 driving instruction information storage
414 three-dimensional map information storage
415 destination information storage
420 server-side controller
421 vehicle's inherent correction information generator
422 collection unit
423 driving instruction information generator
424 three-dimensional map information update unit
430 server-side communication unit
500 another vehicle
600 obstacle
700 surveying vehicle laser radar

What is claimed is:
1. A vehicle comprising:
at least two wheels;
a body coupled to the at least two wheels;
a wireless communicator;
a sensor located on the body and configured to acquire ambient three-dimensional information;
a memory circuit storing first correction information of the sensor of the vehicle and three-dimensional map information,
wherein the vehicle corrects first ambient three-dimensional information acquired by the sensor, to first corrected ambient three-dimensional information with the first correction information stored in the memory circuit, and transmits difference information between the three-dimensional map information and the first ambient three-dimensional information through the wireless communicator,
wherein the vehicle replaces the first correction information of the sensor of the vehicle, stored in the memory circuit, with second correction information received through the wireless communicator, and
wherein the vehicle corrects second ambient three-dimensional information acquired by the sensor, to second corrected ambient three-dimensional information with the second correction information stored in the memory circuit.

2. The vehicle according to claim 1, wherein the wireless communicator of the vehicle is configured to communicate with an information management server,
wherein the information management server is located at a remote location from the vehicle,
the wireless communicator of the vehicle transmits the difference information to the information management server, and
the wireless communicator of the vehicle receives at least one of the first correction information or the second correction information from the information management server.

3. The vehicle according to claim 2, wherein the information management server is configured to determine the at least one of the first correction information or the second correction information from the difference information.

4. The vehicle according to claim 2, wherein each of the first correction information and the second correction information corresponds to at least a mounting position of the sensor on the vehicle.

5. The vehicle according to claim 1, further comprising a controller circuit,
wherein the controller circuit of the vehicle corrects the first ambient three-dimensional information to the first corrected ambient three-dimensional information with the first correction information, replaces the first correction information with the second correction information, and corrects the second ambient three-dimensional information to the second corrected ambient three-dimensional information with the second correction information.

6. The vehicle according to claim 1, further comprising a GPS receiver configured to acquire position information of the vehicle,
wherein the vehicle determines the difference information from the three-dimensional map information and the first ambient three-dimensional information with the position information of the vehicle.

7. The vehicle according to claim 1, wherein the sensor of the vehicle comprises at least one of a camera or a laser radar.

8. An information management device configured to be mounted in a vehicle, the information management device comprising:
a memory circuit storing first correction information of the sensor of the vehicle and three-dimensional map information, and
a controller circuit,
wherein the vehicle comprises at least two wheels, a body coupled to the at least two wheels, a wireless communicator, and a sensor located on the body and configured to acquire ambient three-dimensional information,
wherein the controller circuit corrects first ambient three-dimensional information acquired by the sensor, to first corrected ambient three-dimensional information with the first correction information stored in the memory circuit, and transmits difference information between the three-dimensional map information and the first ambient three-dimensional information through the wireless communicator, wherein the controller circuit replaces the first correction information of the sensor of the vehicle, stored in the memory circuit, with second correction information received through the wireless communicator, and wherein the controller circuit corrects second ambient three-dimensional information acquired by the sensor, to second corrected ambient three-dimensional information with the second correction information stored in the memory circuit.

9. The information management device according to claim 8, further configured to communicate, via the wireless communicator of the vehicle, with an information management server, wherein the information management server is distinct from the vehicle, the wireless communicator of the vehicle transmits the difference information to the information management server, and wherein the wireless communicator of the vehicle receives at least one of the first correction information or the second correction information from the information management server.

10. The information management device according to claim 9, wherein the at least one of the first correction information or the second correction information is determined by the information management server from the difference information.

11. The information management device according to claim 9, wherein each of the first correction information and the second correction information corresponds to at least a mounting position of the sensor on the vehicle.

12. The information management device according to claim 8, the vehicle further comprising a GPS receiver configured to acquire position information of the vehicle, wherein the information management device determines the difference information from the three-dimensional map information and the first ambient three-dimensional information with the position information of the vehicle.

13. The information management device according to claim 8, wherein the sensor of the vehicle comprises at least one of a camera or a laser radar.

14. A correction information management system comprising:

a vehicle comprising at least two wheels, a body coupled to the at least two wheels, a wireless communicator, a sensor located on the body and configured to acquire ambient three-dimensional information, a memory circuit storing first correction information of the sensor of the vehicle and three-dimensional map information;

an information management server configured to communicate with the wireless communicator of the vehicle, and located at a remote location from the vehicle, wherein the vehicle corrects first ambient three-dimensional information acquired by the sensor, to first corrected ambient three-dimensional information with the first correction information stored in the memory circuit, and transmits difference information between the three-dimensional map information and the first ambient three-dimensional information through the wireless communicator, wherein the vehicle replaces the first correction information of the sensor of the vehicle, stored in the memory circuit, with second correction information received through the wireless communicator, wherein the vehicle corrects second ambient three-dimensional information acquired by the sensor, to second corrected ambient three-dimensional information with the second correction information stored in the memory circuit, wherein the wireless communicator of the vehicle transmits the difference information to the information management server, and wherein the wireless communicator of the vehicle receives at least one of the first correction information or the second correction information from the information management server.

15. The correction information management system according to claim 14, wherein the information management server is configured to determine the at least one of the first correction information or the second correction information from the difference information.

16. The correction information management system according to claim 14, wherein each of the first correction information and the second correction information corresponds to at least a mounting position of the sensor on the vehicle.

17. The correction information management system according to claim 14, wherein the vehicle further comprises a controller circuit, wherein the controller circuit of the vehicle corrects the first ambient three-dimensional information to the first corrected ambient three-dimensional information with the first correction information, replaces the first correction information with the second correction information, and corrects the second ambient three-dimensional information to the second corrected ambient three-dimensional information with the second correction information.

18. The correction information management system according to claim 14, wherein the vehicle further comprises a GPS receiver configured to acquire position information of the vehicle, wherein the vehicle determines the difference information from the three-dimensional map information and the first ambient three-dimensional information with the position information of the vehicle.

19. The correction information management system according to claim 14, wherein the sensor of the vehicle comprises at least one of a camera or a laser radar.

* * * * *